Patented Nov. 14, 1933

1,935,279

UNITED STATES PATENT OFFICE 1,935,279

TREATMENT OF RUBBER

William P. ter Horst, Akron, Ohio, assignor to The Naugatuck Chemical Company, Naugatuck, Conn., a corporation of Connecticut No Drawing. Original application September 24, 1931, Serial No. 564,979. Divided and this application December 17, 1932. Serial No. 647,830

12 Claims. (Cl. 18—50)

This invention relates to the treatment of rubber and similar materials, more particularly to a treatment of the same with the reaction product of a ketone and certain aromatic amine or amino compounds. The invention also relates to the products of such treatment.

This case is a division of case Serial No. 564,979, filed Sept. 24, 1931.

An object of this invention is to provide materials having the property of retarding the deterioration of rubber. Other objects will be apparent from the following detailed description.

Accordingly the invention comprises treating rubber or similar materials with the reaction product of a ketone and a di-(arylamino) diaryl dialkyl methane.

The following ketones may be used: phorone, diethyl ketone, benzo phenone, aceto-phenone, dichlor acetone, aldol acetone, allyl-acetone, benzal acetone, diacetyl, acetyl-acetone, acetonyl-acetone, salicylaldehyde-acetone, furfural acetone, mesityl oxide, diacetone alcohol, methyl ethyl ketone, ethylidene acetone and formaldehyde-acetone reaction product. The following aromatic amino compounds may be used: p,p'-di-(naphthylamino) diphenyl dimethyl methane, and corresponding substituted methanes employing homologous aryl and alkyl groups which are the fair equivalents of the first mentioned compound.

The reaction may be carried out with or without the aid of a dehydrating agent. The following chemicals or mixtures thereof may be used as dehydrating agents: calcium chloride, iodine, sulfanilic acid, phosphorus pentoxide, sodium hydroxide, magnesium perchlorate, acetic acid, barium oxide, zinc chloride, hydrochloric acid, sulfuric acid, etc. It is an advantage to use the amine-addition product with zinc chloride, for example $(C_6H_5NH_2)_2$, $ZnCl_2$, as a dehydrating agent.

The following is to be understood as merely illustrating the preparation and use of the ketone-amine reaction products and is not limiting thereof:

Example 1.—338 parts of diphenylamine, 550 parts of acetone and 2 parts of iodine are heated in an autoclave at a temperature of approximately 220° C. during 28 hrs. At the end of this time unreacted acetone is recovered by distillation and water which is formed during the reaction is also removed by distillation. The residual product is a black oil and weighs 411 parts. .75 parts of the product are incorporated in the usual manner in a standard tire tread stock containing 100 parts rubber, 1¼ parts of mercaptobenzothiazole; and 42 parts carbon black.

Example 2.—The reaction product of acetone and phenyl beta-naphthylamine is made by heating an excess of acetone with phenyl beta-naphthylamine and a small quantity of iodine or other dehydrating agents at a temperature of 200° C. or higher during a prolonged time in an autoclave. At the end of this time excess of acetone and other low boiling materials are removed. It is advisable to remove unreacted phenyl-beta-naphthylamine from the crude reaction product by distillation under vacuum. The product obtained in this way is a black paste having excellent antioxidant properties.

It is to be understood that a mixture of the reaction products may be used in rubber instead of a single reaction product. Also that a mixture of ketones or a single ketone may be reacted with a single amino compound or with a mixture of amino compounds to give products that may be used in rubber in the same manner.

It is to be understood that the procedures given in the illustrative examples are indicative of those that may be used in reacting the ketone and di-(arylamino) diaryl dialkyl methane but that changes may be made in proportions and temperatures as will be apparent to those skilled in the art.

The chemicals disclosed may be used to improve the properties as mentioned herein of inner tubes, tires, thread, hose, dipped goods, mechanical goods, latex or articles made from latex, etc.

In the claims the term "ketone" is to be understood as meaning organic compounds containing one or more keto groups

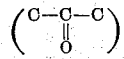

but containing no carboxylic acid

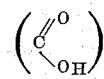

or ester groups

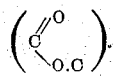

The term "rubber" is to be construed as including natural rubber, gutta percha, balata, synthetic rubber, or other rubber-like materials.

With the detailed description given above, it will be obvious that modifications will suggest themselves without departing from the principle of the invention, for example the product resulting from the reaction of a ketone and an aromatic amino compound may also be prepared by reacting the corresponding thioketone or the corresponding ketone dihalide with the amino compound, and it is not desired to limit the invention otherwise than as set forth in the appended claims.

Having thus described my invention, what I claim and desire to protect by Letters Patent is:

1. A process of improving the properties of rubber which comprises treating rubber with the reaction product of a ketone and a di-(arylamino) diaryl dialkyl methane.

2. A process of improving the properties of rubber which comprises treating rubber with the reaction product of an aliphatic ketone and a di-(arylamino) diaryl dialkyl methane.

3. A process of improving the properties of rubber which comprises treating rubber with the reaction product of acetone and a di-(arylamino) diaryl dialkyl methane.

4. A process of improving the properties of rubber which comprises treating rubber with the reaction product of a ketone and p,p'-di(naphthylamino) diphenyl dimethyl methane.

5. A process of improving the properties of rubber which comprises treating rubber with the reaction product of an aliphatic ketone and p,p'-di(naphthylamino) diphenyl dimethyl methane.

6. A process of improving the properties of rubber which comprises treating rubber with the reaction product of acetone and p,p'-di(naphthylamino) diphenyl dimethyl methane.

7. A vulcanized rubber product containing rubber which has been vulcanized in the presence of a ketone and a di-(arylamino) diaryl dialkyl methane.

8. A vulcanized rubber product containing rubber which has been vulcanized in the presence of an aliphatic ketone and a di-(arylamino) diaryl dialkyl methane.

9. A vulcanized rubber product containing rubber which has been vulcanized in the presence of acetone and a di-(arylamino) diaryl dialkyl methane.

10. A vulcanized rubber product containing rubber which has been vulcanized in the presence of a ketone and p,p'-di(naphthylamino) diphenyl dimethyl methane.

11. A vulcanized rubber product containing rubber which has been vulcanized in the presence of an aliphatic ketone and p,p'-di(naphthylamino) diphenyl dimethyl methane.

12. A vulcanized rubber product containing rubber which has been vulcanized in the presence of acetone and p,p'-di(naphthylamino) diphenyl dimethyl methane.

WILLIAM P. ter HORST.